(12) United States Patent
Iijima (10) Patent No.: US 7,957,675 B2
(45) Date of Patent: Jun. 7, 2011

(54) OPENING AND CLOSING ASSEMBLY AND IMAGE FORMING APPARATUS INCLUDING THE ASSEMBLY

(75) Inventor: Shota Iijima, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 12/540,691

(22) Filed: Aug. 13, 2009

(65) Prior Publication Data

US 2010/0040394 A1 Feb. 18, 2010

(30) Foreign Application Priority Data

Aug. 18, 2008 (JP) ................. 2008-210052

(51) Int. Cl.
*G03G 15/00* (2006.01)
*G03G 21/16* (2006.01)
*B41J 29/13* (2006.01)

(52) U.S. Cl. ........................ 399/125; 347/108

(58) Field of Classification Search ............. 399/107, 399/125, 367, 377, 379, 380; 347/108; 220/254.1, 220/254.7, 831–835; 312/319.2, 326–329, 312/350

See application file for complete search history.

(56) References Cited

U.S. PATENT DOCUMENTS

| | | | |
|---|---|---|---|
| 5,979,599 A * | 11/1999 | Noles | 182/36 |
| 6,409,175 B1 * | 6/2002 | Evans et al. | 277/314 |
| 7,369,794 B2 * | 5/2008 | Kawai et al. | 399/125 |
| 2007/0292159 A1 | 12/2007 | Iijima | |

FOREIGN PATENT DOCUMENTS

JP 3093658 U 2/2003
JP 2007-331337 A 12/2007

* cited by examiner

*Primary Examiner* — David M Gray
*Assistant Examiner* — Gregory H Curran
(74) *Attorney, Agent, or Firm* — Baker Botts L.L.P.

(57) ABSTRACT

An opening and closing assembly includes a first casing, a second casing pivotally coupled to the first casing, and a support stand configured to support the second casing. The support stand includes a proximal end portion pivotally connected to one of the first and second casings, and a distal end portion slidably connected to the other thereof. The other of the first and second casings includes a guide portion for guiding the distal end portion, and first and second wall portions. The distal end portion includes a gripped portion gripped between the first and second wall portions, the gripped portion has a cross section having a width which increases, from one end of the cross section, to a maximum width and decreases from the maximum width until the other end of the cross section. The maximum width causes the first and second wall portions to be spaced apart.

14 Claims, 10 Drawing Sheets

OPENING AND CLOSING ASSEMBLY AND IMAGE FORMING APPARATUS INCLUDING THE ASSEMBLY

CROSS REFERENCE TO RELATED APPLICATION

This application claims priority to and the benefit of Japanese Patent Application No. 2008-210052, filed Aug. 18, 2008, the entire disclosure of which is incorporated herein by reference.

BACKGROUND OF THE INVENTION

1. Field of the Invention

The invention relates to an opening and closing assembly including a first casing a second casing pivotally coupled to the first casing, and a support stand configured to maintain the second casing in an open position, and relates to an image forming apparatus having the opening and closing assembly.

2. Description of Related Art

As an example of an image forming apparatus, a multifunction device is provided with an image recording unit for recording image on a recording sheet and an image reading unit for reading an image on an original. As an example of the image reading unit, a flatbed type is known.

Generally, the flatbed-type image reading unit is pivotally disposed on top of the image recording unit in the multifunction device. As a mechanism to maintain the image reading unit in an open position with respect to the image recording unit, the multifunction device includes a support stand having a friction member at an end of the support stand. The image reading unit can be prevented from being rapidly pivoted toward the image recording unit.

SUMMARY OF THE INVENTION

Aspects of the invention provide an opening and closing assembly and an image forming apparatus including the opening and closing assembly.

In an aspect of the invention, an opening and closing assembly may comprise a first casing having a connected portion and a distant portion that is distant from the connected portion; a second casing having a connected portion and a distant portion that is distant from the connected portion of the second casing, the second casing being connected at the connected portion thereof to the connected portion of the first casing, and being pivotable about the connected portions of the respective first and second casings relative to the first casing so as to be selectively placed in open and closed positions relative to the first casing; and a support stand configured to support the second casing so as to maintain the open position of the second casing when the second casing is to be held in the open position, the support stand including a proximal end portion that is pivotably connected to the distant portion of one of the first and second casings and a distal end portion that is slidably connected to the other of the first and second casings. The other of the first and second casings may include a guide portion configured to guide the distal end portion of the support stand, for permitting the distal end portion of the support stand to be slidable between the connected portion and the distant portion of the other of the first and second casings, and first and second wall portions opposed to each other and cooperating with each other for gripping the distal end portion of the support stand that is interposed between the first and second wall portions. The distal end portion of the support stand may include a gripped portion at which the distal end portion is gripped between the first and second wall portions of the other of the first and second casings, and the gripped portion may be brought into slidable contact with the first and second wall portions of the other of the first and second casings. The gripped portion may have a cross section having a width and a length. The width of the cross section increases from one end of the cross section to a maximum width and decreases from the maximum width until the other end of the cross section. The maximum width of the cross section of the gripped portion may cause the first and second wall portions of the other of the first and second casings to be spaced apart.

BRIEF DESCRIPTION OF THE DRAWINGS

For a more complete understanding of the present invention, and the needs satisfied thereby, reference now is made to the following descriptions taken in connection with the accompanying drawings.

DETAILED DESCRIPTION OF PREFERRED EMBODIMENTS

Embodiments of the present invention and their features and technical advantages may be understood by referring to accompanying drawings, like numerals being used for like corresponding portions in the various drawings.

Figure 1:
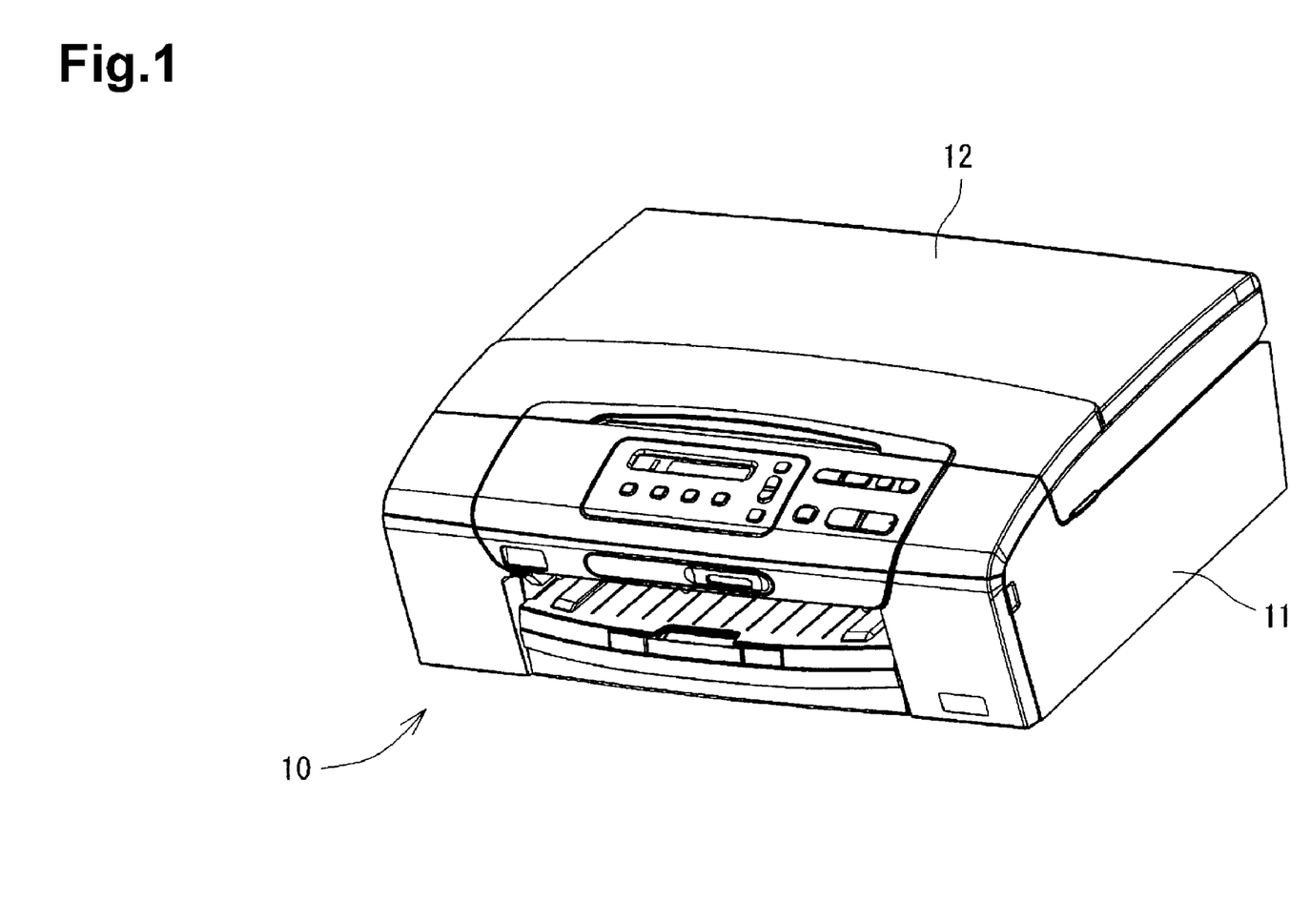
FIG. 1 is a perspective view of a multifunction device according to an embodiment of the invention.

A multifunction device 10 shown in FIG. 1 is an example of a rotation apparatus according to an embodiment of the invention. As shown in FIG. 1, multifunction device 10 may include a first casing, e.g. a casing for a printer unit 11, and a second casing, e.g. a casing for a scanner unit 12. Multifunction device 10 may combine functions of a printer, scanner, copier and fax machine. Printer unit 11 is disposed in a lower portion of multifunction device 10, and scanner unit 12 is disposed in an upper portion of multifunction device 10.

Printer unit 11 is configured to record images and text on a recording medium, e.g. a recording sheet, based on image data scanned by scanner unit 12 and recorded data externally input. As the invention does not directly relate to an internal structure of printer unit 11, a detailed description thereof is omitted. However, printer unit 11 may be comprised of a structure used for a known inkjet printer.

Scanner unit 12 is configured to optically read image and text of a document and convert them into electronic data. As the invention does not directly relate to an internal structure of scanner unit 12, a detailed description thereof is omitted. However, scanner unit 12 may be comprised of a structure for a known flatbed scanner.

Figure 2:
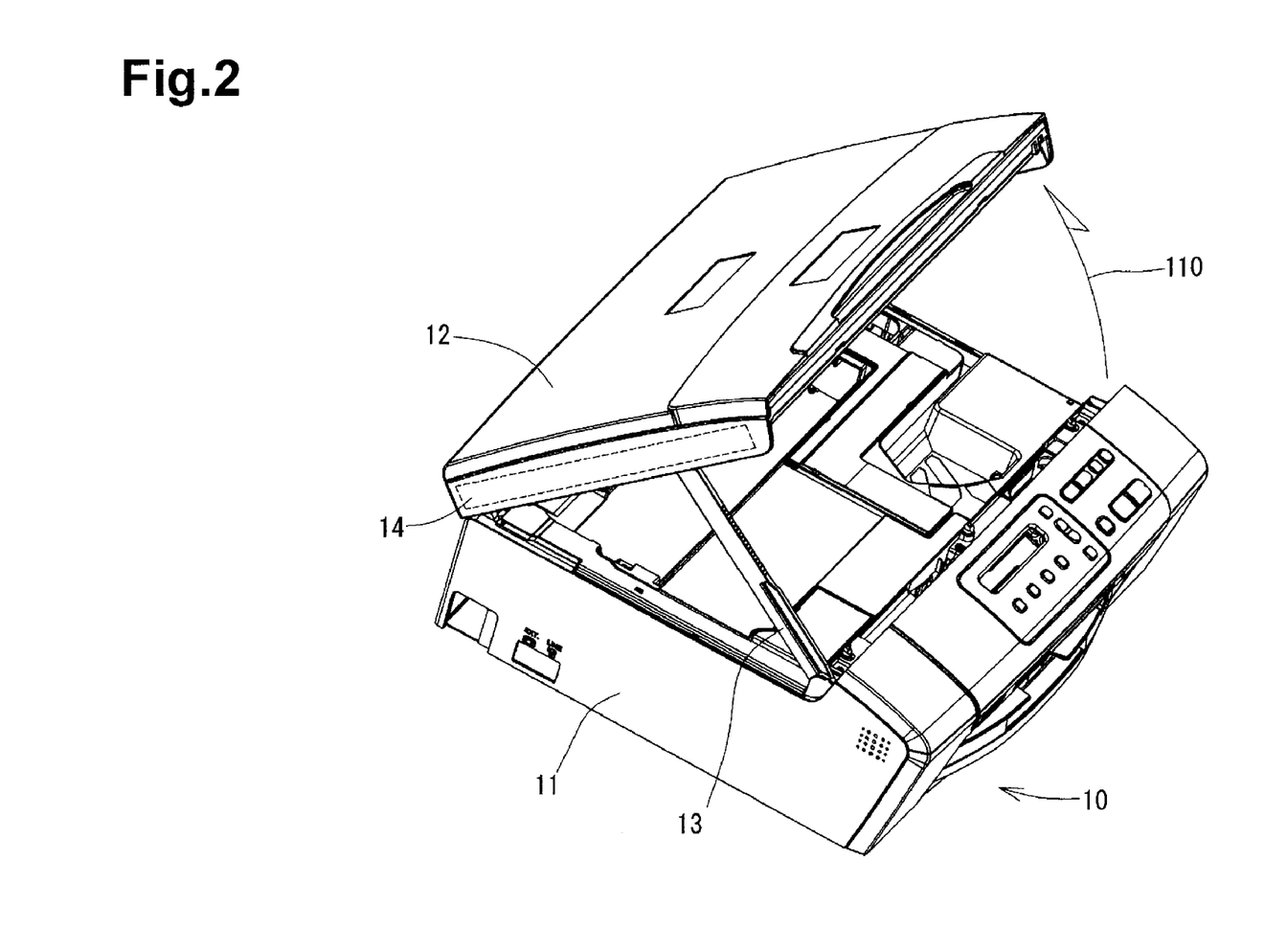
FIG. 2 is a perspective view of the multifunction device when a scanner unit is in a first position.

A structure in which scanner unit 12 is rotated with respect to printer unit 11 will be described. Scanner unit 12 is coupled to printer 11 via a hinge portion, which is disposed at a rear side of multifunction device 10 (on the left side of FIG. 2). Although the hinge portion is not shown in any drawings, it may include a known structure. Scanner unit 12 is rotatable upward as shown by an arrow 110 of FIG. 2 from printer unit 11, taking a front side of scanner unit 12 as a rotating end. As shown in FIG. 2, a position of scanner unit 12 that is rotated upward for access to a top surface of printer unit 11 is referred to as a first position. As shown in FIG. 1, a position of scanner unit 12 that closes the top surface of printer unit 11 is referred to as a second position.

As shown in FIG. 2, a support stand 13 is disposed between printer unit 11 and scanner unit 12. Support stand 13 is shaped in a rectangle having a length, which is slightly shorter than a depth of the multifunction device 10. Support stand 13 has a first end portion 21 (FIG. 5) and a second end portion 22. First end portion 21 is rotatably connected to a front side of printer unit 11 (on the right side of FIG. 2), and second end portion 22 is inserted into a guide member 14 (FIG. 3) provided at scanner unit 12. Stand 13 is configured to support scanner unit 12 in the first position from diagonally below, like a strut. A detailed structure of stand 13 will be described later.

As indicated by a dotted line of FIG. 2, guide member 14 is accommodated in a bottom surface of the scanner unit 12 and to a left surface thereof. Although not shown in detail in FIG. 2, guide member 14 is fitted into a recessed portion formed in the bottom surface of the scanner unit 12 and assembled as a part of scanner unit 12. A length of guide member 114, which is shown in FIG. 3 as a longitudinal direction 111, aligns with a depth dimension of scanner unit 12.

Figure 3A:
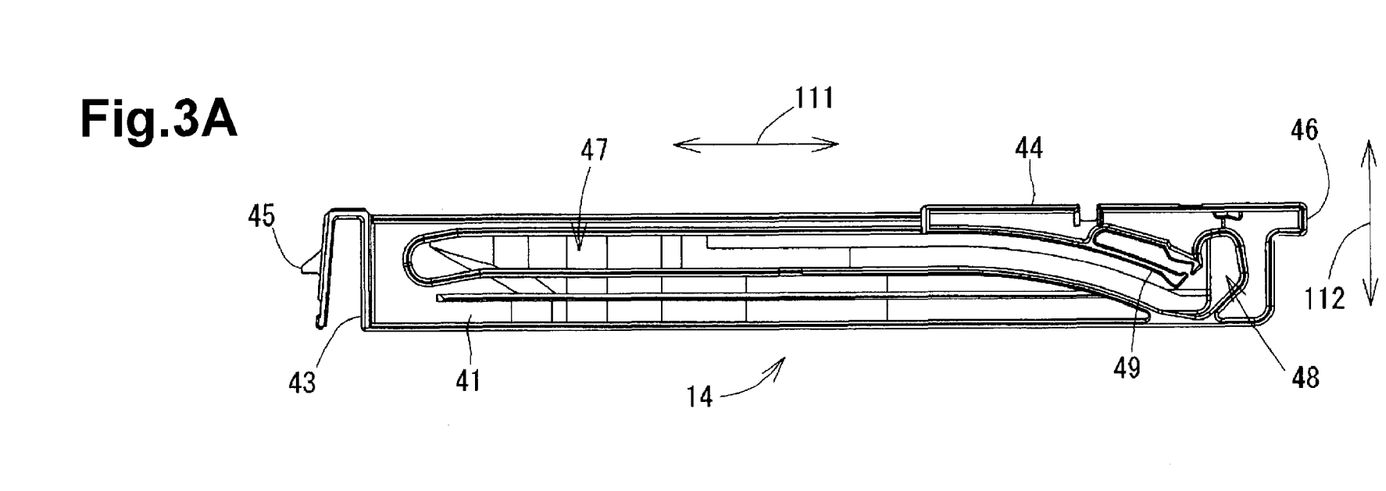
FIG. 3A is a left side view of a guide member.
Figure 3B:
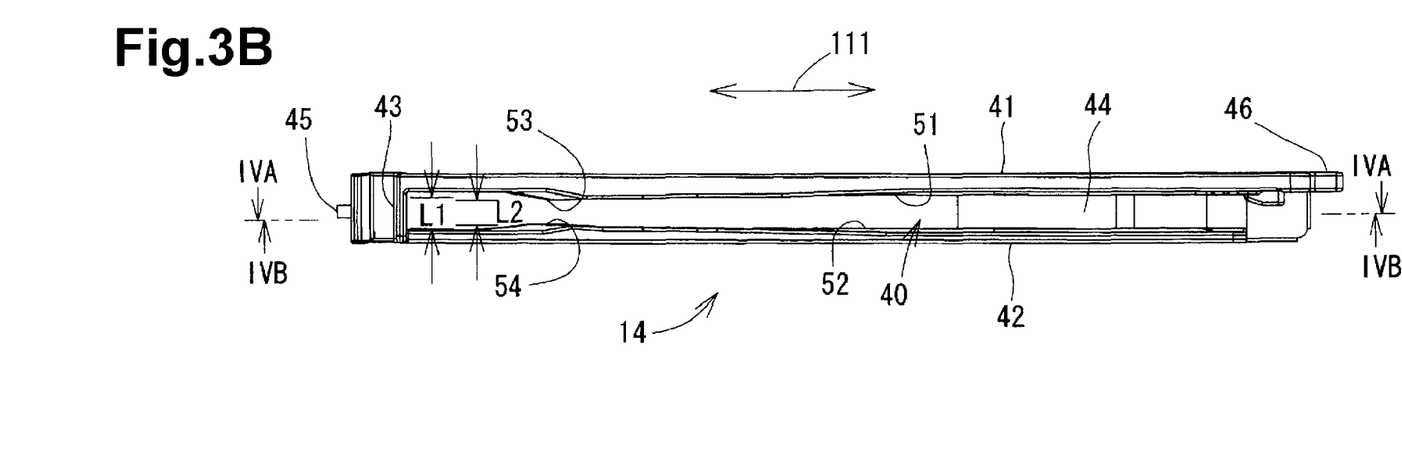
FIG. 3B is a bottom view of the guide member.
Figure 4A:
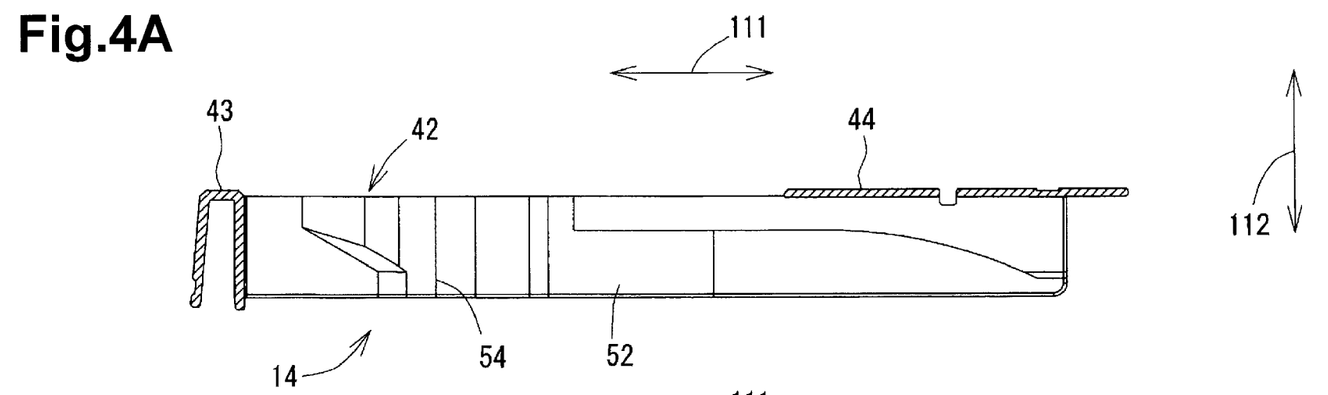
FIG. 4A is a cross sectional view of the guide member along the line IVA-IVA of FIG. 3B.

Guide member 14 is open on a bottom side thereof, and thus is shaped in an inverse "U" in cross section taken along a height direction 112 of the multifunction device 10. Guide member 14 is mounted onto scanner unit 12 so as to open on the bottom side of scanner unit 12. In FIGS. 3A and 4A, guide member 14 is shown as being open downward. As shown in FIG. 3B, guide member 14 includes two opposed sidewalls 41, 42 extending in longitudinal direction 111. Sidewalls 41, 42 are spaced apart by a specified distance L1 and mainly define an opening 40 therebetween. Opening 40 is formed along almost all a lower end of each of sidewalls 41, 42. Opening 40 continues in longitudinal direction 111 of sidewalls 41, 42. Opening 40 is an example of a guide groove of the invention, and second end portion 22 of stand 13 is inserted into opening 40.

Sidewalls 41, 42 are connected by connecting portions 43, 44 at their one end in longitudinal direction 111 and their upper end. Connecting portion 43 is disposed at an end of guide member 14 in longitudinal direction 111 corresponding to the rear side of multifunction device 10. Connecting portion 43 is formed with an engaging protrusion 45. Engaging protrusion 45 is formed at a central portion of connecting portion 43 in the height direction, and protrudes outward along the longitudinal direction 111. Sidewall 41 is formed with an engaging protrusion 46 in the vicinity of an upper end of sidewall 41. Engaging protrusion 46 is formed at an end in longitudinal direction 111 opposite the engaging protrusion 45. Engaging protrusion 46 is an extension of an upper portion of sidewall 41 along longitudinal direction 111, and protrudes outward in longitudinal direction 111.

Although it is not shown, guide member 14 is fitted into the recessed portion formed in the bottom surface of scanner unit 12 by engaging protrusions 45, 46. The recessed portion of scanner unit 12 is provided with holes in which engaging protrusions 45, 46 engage. By engaging engaging protrusion 45 in one of the holes, one end of guide member 14 in longitudinal direction 111 is fixed in position in a depth dimension of the recessed portion or in height direction 112 of scanner unit 12. By engaging engaging protrusion 46 in the other hole, the other end of guide member 14 in longitudinal direction 111 is supported so as to move vertically with respect to the depth dimension of the recessed portion. Namely, engaging protrusion 46 engages in a long hole that is long in the depth dimension of the recessed portion, and thus is capable of moving within the dimension of the long hole. As guide member 14 is assembled to scanner unit 12 in this manner, it is movable vertically at engaging protrusion 46 side, taking engaging protrusion 45 as a shaft. Guide member 14 mounted into scanner unit 12 is capable of moving vertically such that its rear side (engaging protrusion 45 side) is taken as a shaft and its front side (engaging protrusion 46 side) moves in and out from the bottom surface of scanner unit 12. This vertical movement causes guide member 14 to move between a pressed position where guide member 14 is pressed against scanner unit 12 and non-pressed position where guide member 14 is separated away from scanner unit 12.

Figure 4B:
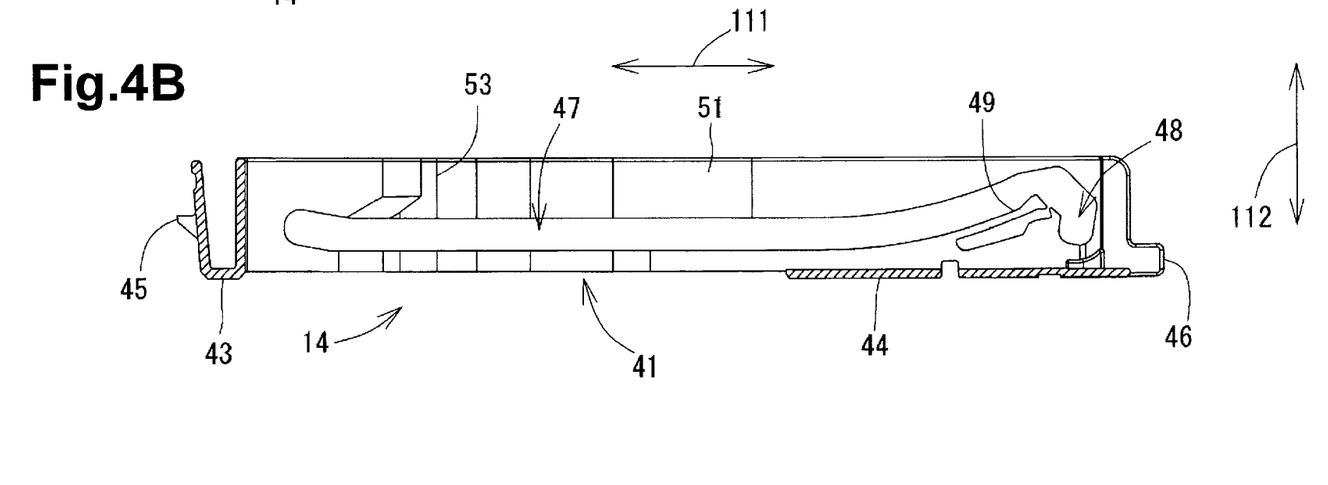
FIG. 4B is a cross sectional view of the guide member along the line IVB-IVB of FIG. 3B.

As shown in FIGS. 3A and 4B, sidewall 41 of guide member 14 has a guide hole 47 formed therethrough and extended generally along longitudinal direction 111. A pin 24 (FIG. 5) provided at second end portion 22 of stand 13 is inserted into guide hole 47. The width of guide hole 47 is set to be slightly greater than the outside diameter of pin 24 so as to allow pin 24 to freely slide along guide hole 47. Pin 24 slides in a direction generally close to longitudinal direction 111.

An engaging hole 48 is formed continuously to an end of guide hole 47 situated to the front side of the multifunction device 10. Engaging hole 48 extends diagonally upward from guide hole 47. When pin 24 slides from guide hole 47 into engaging hole 48, stand 13 is held in a position to support scanner unit 12 in the first position as shown in FIG. 2.

An arm 49 is disposed in a boundary between guide hole 47 and engaging hole 48. Arm 49 is elastically deformable in a direction to increase the width of guide hole 47. Arm 49 protrudes from an upper end of guide hole 47 toward the boundary between guide hole 47 and engaging hole 48. A protruding end of arm 49 is widened to narrow the width of guide hole 47. Thus, to cause pin 24 of stand 13 to pass between guide hole 47 and engaging hole 48, arm 49 is required to be elastically deformed toward the upper end of guide hole 47. As arm 49 is elastically deformed and restored to normal state, arm 49 provides a feel of the click generated when pin 24 of stand 13 is passed between guide hole 47 and engaging hole 48.

Sidewalls 41, 42 have inner surfaces 51, 52, respectively, which are spaced apart by distance L1 and opposed to each other. A part of each inner surface 51, 52 lower than guide hole 47 slidingly contacts a friction member 16 provided at stand 13. Each inner surface 51, 52 is formed to substantially the same length as guide hole 47 along longitudinal direction 111.

The inner surfaces 51, 52 are provided with bulging portions 53, 54, respectively, on the side where engaging protrusion 45 is formed or on a side close to the rear side of multifunction device 10. Bulging portions 53, 54 stick out toward respective opposed inner surfaces 51, 52, each forming a mountain shape. Slopes of the mountain shape that forms each bulging portion 53, 54 are provided such that a slope extending from the top of the mountain shape toward engaging protrusion 45 is steeper than a slope extending from the top toward engaging protrusion 46. Distance L1 between inner surfaces 51, 52 is narrowed at bulging portions 53, 54. Distance L1 becomes a distance L2 at between tops of bulging portions 53, 54, which is the narrowest distance between the inner surfaces 51, 52 (L1>L2).

Figure 5:
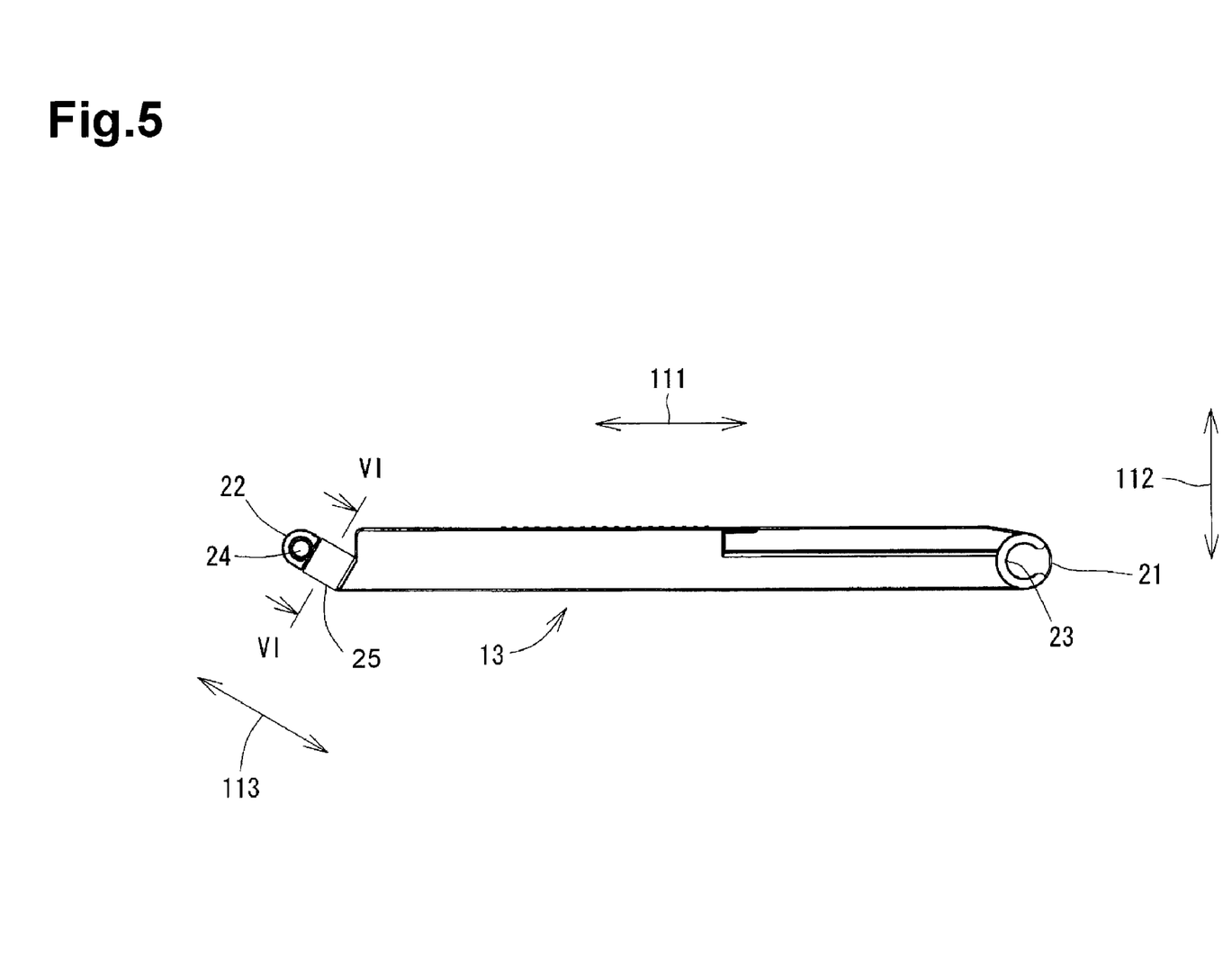
FIG. 5 is a left side view of a support stand.

When scanner unit 12 is in the second position shown in FIG. 1, stand 13 is positioned as shown in FIG. 5. Stand 13 is generally a flat plate-like member wide in height direction 112 and long in longitudinal direction 111. First end portion 21 of stand 13 is formed with a hole 23 recessed in the thickness of stand 13 on one side thereof. Hole 23 receives a pin (not shown) provided in printer unit 11, so that first end portion 21 of stand 13 is rotatably coupled to printer unit 11.

Second end portion 22 of stand 13 is slightly bent with respect to longitudinal direction 111 and protrudes diagonally upward as shown by double-headed arrow 113. Second end portion 22 is inserted into opening 40 of guide member 14. Arrow 113 indicates a direction of insertion. Second end portion 22 is formed with pin 24 protruding in the thickness of stand 13 (in a direction perpendicular to the sheet of FIG. 5). As described above, pin 24 is inserted into guide hole 47 of guide member 14 and movable along guide hole 47.

Figure 6:
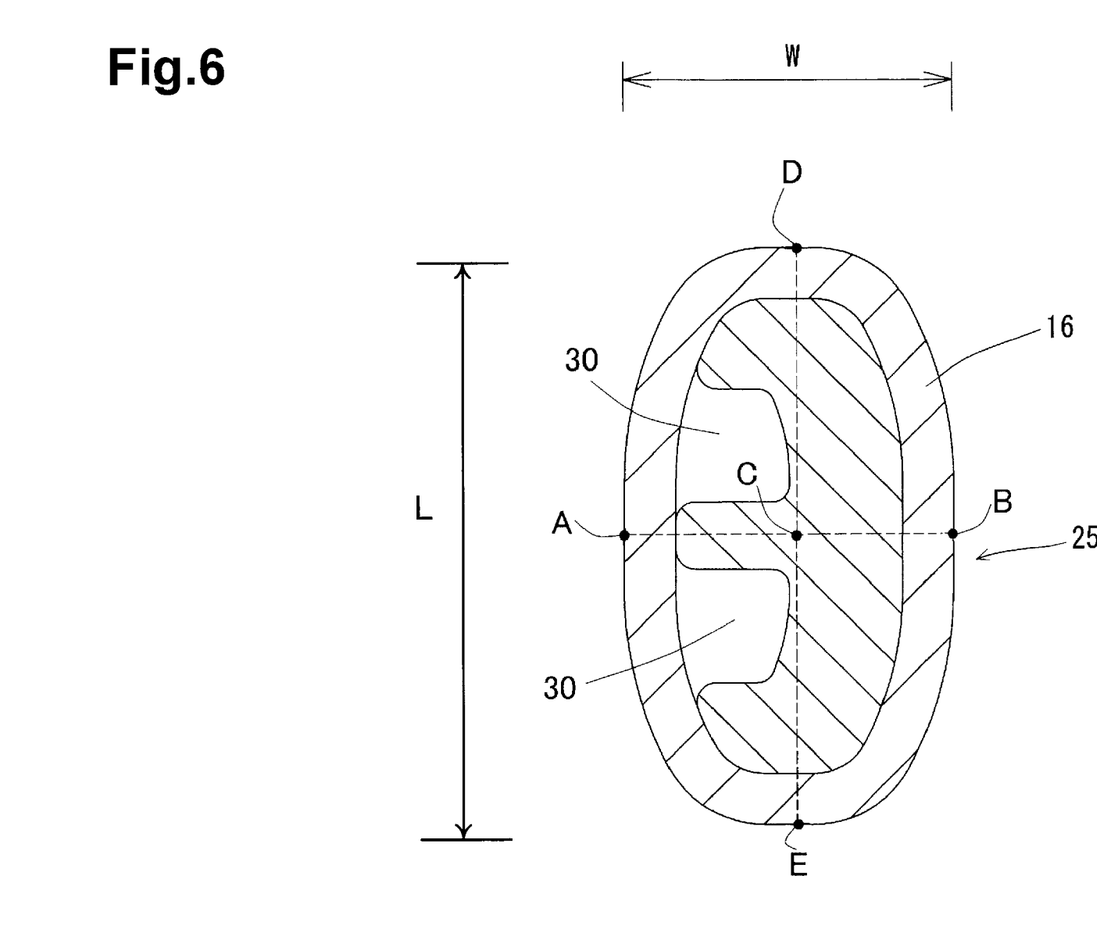
FIG. 6 is a cross sectional view of a neck portion of the support stand along the line VI-VI of FIG. 5.

Second end portion 22 includes a gripped portion in the form of neck portion 25 (FIG. 6) that is located in the vicinity of pin 24. Neck portion 25 is disposed between pin 24 and a main body of stand 13. As shown in FIG. 6, neck portion 25 is generally oval in cross section taken along a line VI-VI of FIG. 5 which is perpendicular to insertion direction 113. The oval shape of neck portion 25 is long in the insertion direction 113 and short in a direction perpendicular to insertion direction 113.

Neck portion 25 includes friction member 16, which contacts inner surfaces 51, 52. Friction member 16 is an elastically deformable member made of rubber. Friction member 16 is a cylindrical tube having a perimeter sufficient to cover the peripheral surface of a body of neck portion 25. Neck portion 25 has spaces 30 covered by friction member 16. Spaces 30 may absorb the deformation of the friction member 16. Neck portion 25 is inserted into opening 40 of guide member 14 to slide on inner surfaces 51, 52 of sidewalls 41, 42 and produce desired sliding friction.

As shown in FIG. 6, in the oval shaped cross section, neck portion 25 has a maximum width W passing through a center C of neck portion 25 and points A and B, and a maximum length L passing through center C of neck portion 25 and points D and E. Points A, B, D, and E are located on perimeter of neck portion 25. Maximum width W of neck portion 25 is wider than distance L1 between inner surfaces 51, 52 of guide member 14 and distance L2 between bulging portions 53, 54 (W>L1>L2). The perimeter of neck portion 25 is divided equally at line passing through points A, C, and B or line passing through points D, C, and E.

Thus, while pin 24 of stand 13 moves along guide hole 47 of guide member 14, neck portion 25 contacts inner surfaces 51, 52 and produces sliding friction. In addition, when neck portion 25 passes between bulging portions 53, 54 of guide member 14, friction member 16 is elastically deformed such that its thickness is reduced. Due to this elastic deformation, a contact pressure between neck portion 25 and bulging portions 53, 54 is increased, and sliding friction therebetween is increased as neck portion 25 slides toward the tops of bulging portions 53, 54.

The following describes operations of stand 13 and guide member 14 along with rotation of scanner unit 12.

As scanner unit 12 is rotated upward with respect to printer unit 11, stand 13 is rotated upward on hole 23 in first end portion 21 as an axis of rotation. Pin 24 in second end portion 22 of stand 13 is slidingly moved in and along guide hole 47 of guide member 14. Guide member 14, which is accommodated in the recessed portion formed in the bottom surface of scanner unit 12, is rotated on the hinge portion provided at the rear side of multifunction device 10 as an axis of rotation along with the rotation of scanner unit 12.

As described above, guide member 14 is moved vertically at engaging protrusion 46 side, taking engaging protrusion 45 as a shaft, so that guide member 14 is moved between the pressed position and the non-pressed position. When scanner unit 12 is rotated toward the first position shown in FIG. 2, if external force does not act on guide member 14, engaging protrusion 46 side of guide member 14 is lowered due to gravity, and protrudes from the bottom surface of scanner unit 12. The part of guide member 14, which protrudes from the bottom surface of scanner unit 12, includes lower edges of inner surfaces 51, 52 of guide member 14, on which neck portion 25 of stand 13 is slid.

For example, when scanner unit 12 is rotated from the first position shown in FIG. 2 to the second position shown in FIG. 1, upward external force acts on guide member 14 via pin 24 of stand 13. The upward external force causes guide member 14 partially protruding from the bottom surface of scanner unit 12 to be retracted in the recessed portion against gravity. Thus, inner surfaces 51, 52 of guide member 14 are also accommodated into the recessed portion of scanner unit 12.

Figure 7:
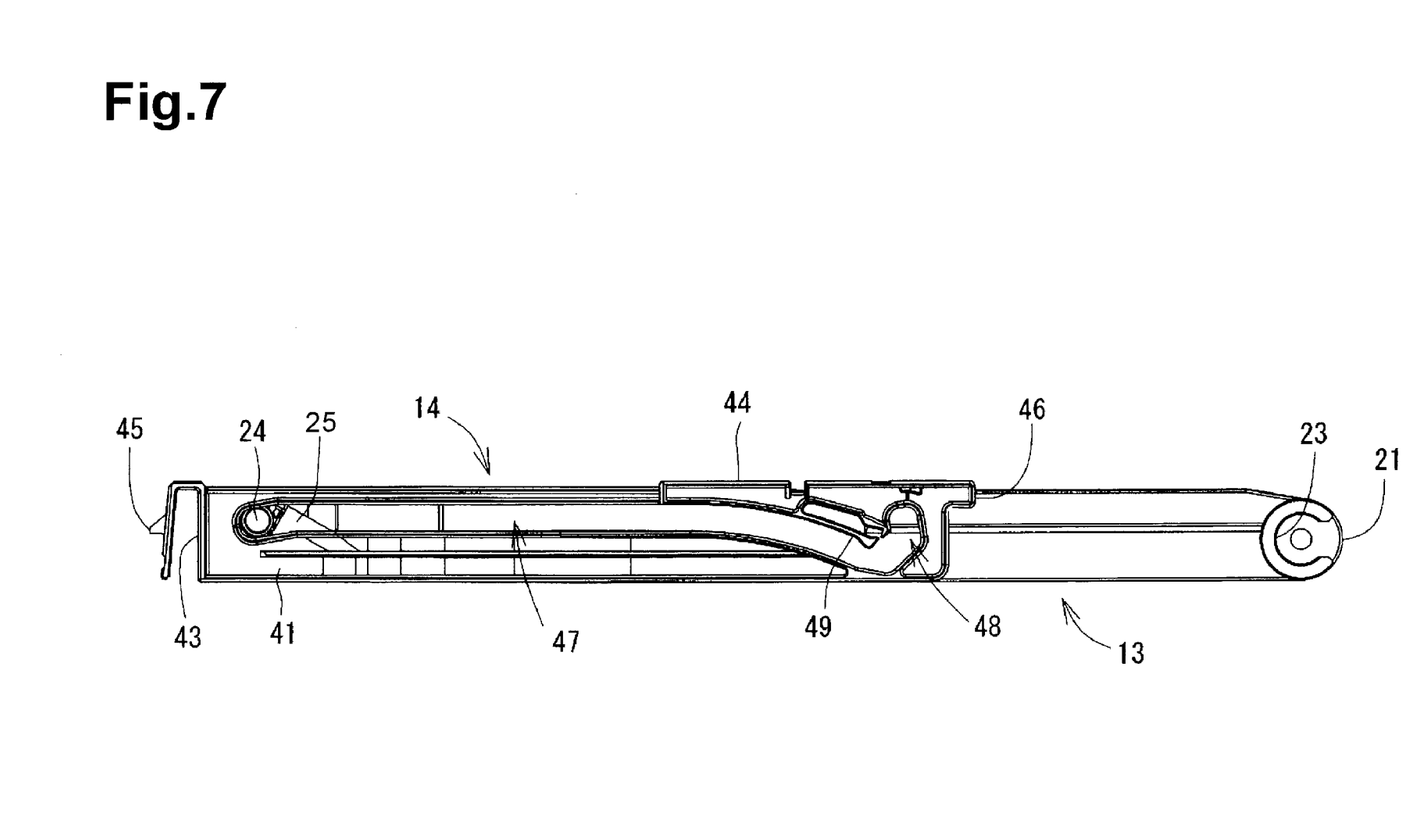
FIG. 7 is a left side view of the support stand and the guide member when the scanner unit is in a second position.

When scanner unit 12 is positioned in the second position as shown in FIG. 1, pin 24 of stand 13 is positioned at the rear end of guide hole 47 of guide member 14 as shown in FIG. 7. Stand 13 and guide member 14 are positioned horizontally along their length.

Figure 8:
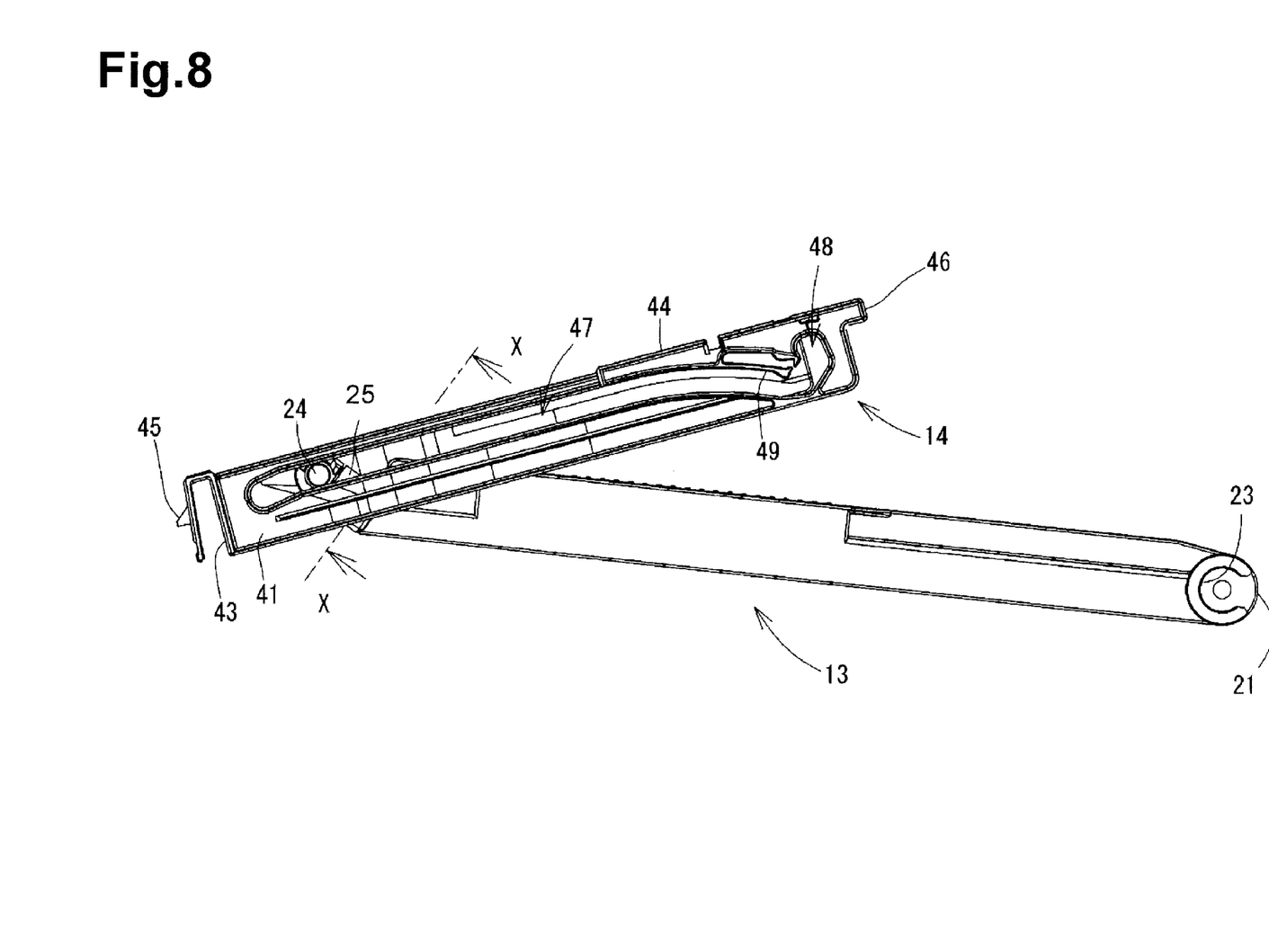
FIG. 8 is a left side view of the support stand and the guide member when the scanner unit is in between the first position and the second position.

When scanner unit 12 is rotated from the second position to the first position, guide member 14 is rotated upward along with scanner unit 12 as shown in FIG. 8. As engaging protrusion 46 side of guide member 14 is rotated upward on the hinge portion as the axis of rotation, pin 24 engaged in guide hole 47 is lifted. Thus, stand 13 is rotated upward on hole 23 of first end portion 21 as the axis of rotation to stand up, which causes pin 24 to slide in guide hole 47 from the rear side to the front side (to engaging hole 48). Along with the sliding of pin 24, neck portion 25 slides on inner surfaces 51, 52 and bulging portions 53, 54.

As a reaction force of guide member 14 that lifts pin 24 engaged in guide hole 47, downward load is applied to guide member 14. Due to the downward load, engaging protrusion 46 side of guide member 14 lowers so as to protrude from the bottom surface of scanner unit 12. Namely, guide member 14 is brought in the non-pressed position.

As described above, when neck portion 25 slides on inner surfaces 51, 52 with guide member 14 placed in the non-pressed position, friction member 16 is elastically deformed such that distance L1 between sidewalls 41, 42 is increased or sidewalls 41, 42 are separated further away from each other. Thus, sliding friction between friction member 16, inner surfaces 51, 52 or bulging portions 53, 54 becomes reduced in comparison with guide member 14 placed in the pressed position, and load applied during rotation of scanner unit 12 from the second position to the first position becomes small.

Figure 9:
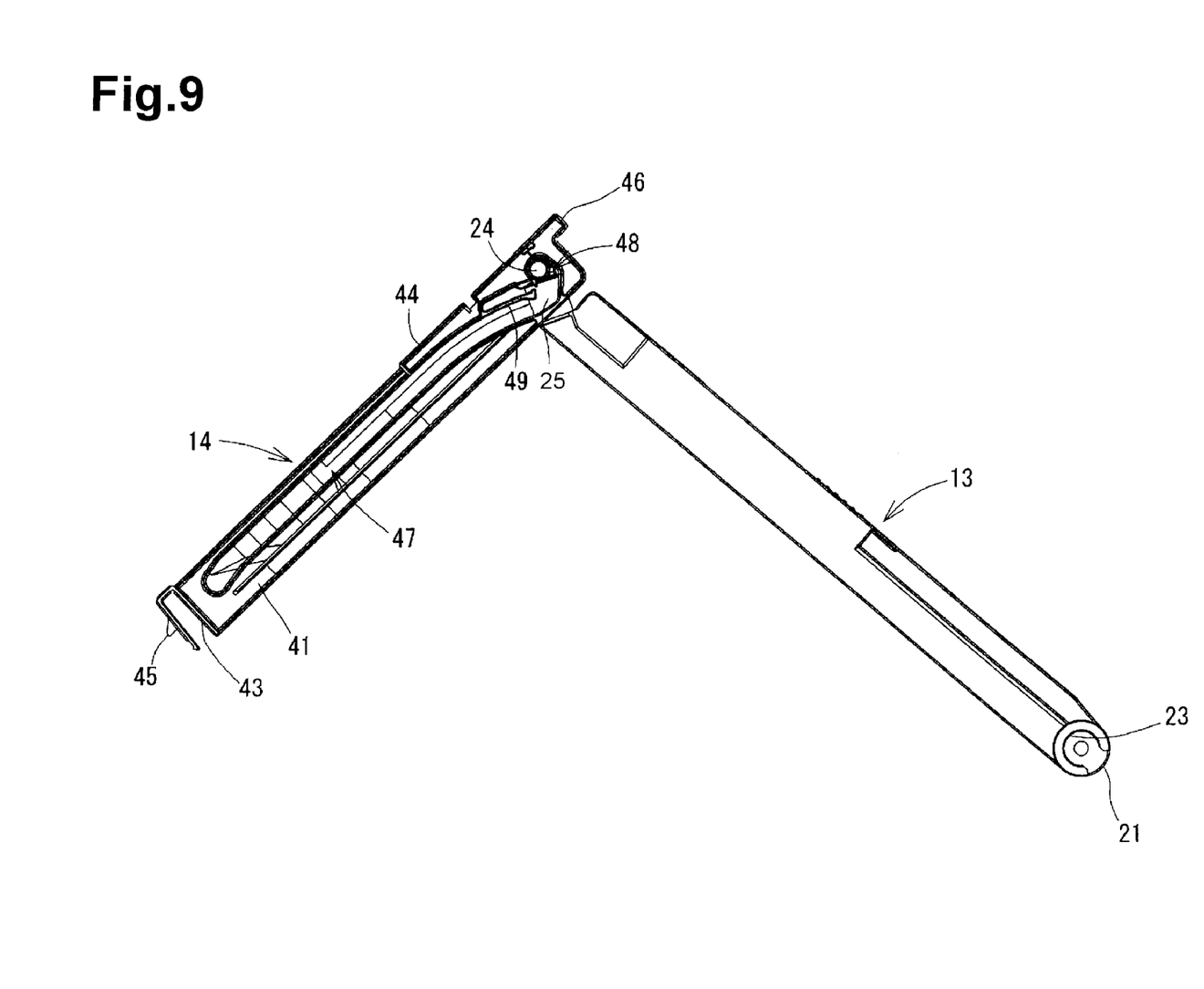
FIG. 9 is a left side view of the support stand and the guide member when the scanner unit is in the first position.

When scanner unit 12 is brought into the first position, pin 24 of stand 13 enters engaging hole 48 of guide member 14 from guide hole 47 as shown in FIG. 9. When pin 24 moves from guide hole 47 to engaging hole 48, it elastically deforms arm 49. When pin 24 completely enters engaging hole 48, arm 49 elastically restores to normal state. A user who holds and rotates scanner unit 12 may feel a click when pin 24 enters engaging hole 48 after arm 49 is elastically deformed and then returns to its normal state. After pin 24 enters engaging hole 48, scanner unit 12 is rotated slightly downward, and pin 24 reaches an end of engaging hole 48 at engaging protrusion 46 side. While pin 24 is engaged in engaging hole 48, pin 24 does not return to guide hole 47 unless scanner unit 12 is lifted again. Thus, stand 13 is kept in a lifted state as shown in FIG. 9. The lifted stand 13 supports scanner unit 12 in the first position like a strut.

To rotate scanner unit 12 from the first position to the second position, scanner unit 12 is temporarily lifted in order to return pin 24 in engaging hole 48 to guide hole 47. The temporary lifting of scanner unit 12 causes pin 24 to move in the vicinity of the border between engaging hole 48 and guide hole 47. Then, scanner unit 12 is lowered, thereby pin 24 elastically deforms arm 49 and enters guide hole 47. When pin 24 enters guide hole 47, arm 49 elastically restores to its normal state. The user who holds and rotates scanner unit 12 may feel a click when pin 24 enters guide hole 47 after arm 49 is elastically deformed and then returns to its normal state.

Pin 24 of stand 13 is engaged in guide hole 47 of guide member 14. When scanner unit 12 is rotated into the second position, guide hole 47 presses pin 24 downward, and stand 13 is rotated on hole 23 in first end portion 21 as the axis of rotation so as to fall down. Accordingly, pin 24 is slid in guide hole 47 from the front side of multifunction device 10 to the rear side thereof.

As a reaction force of guide member 14 that presses pin 24 engaged in guide hole 47 downward, upward load is applied to guide member 14. Engaging protrusion 46 side of guide member 14 is lifted, and accommodated in the recessed portion of scanner unit 12. Namely, guide member 14 is brought in the pressed position.

Due to guide member 14 placed in the pressed position, sidewalls 41, 42 keep distance L1 when neck portion 25 slides on inner surfaces 51, 52 of guide member 14. In other words, sidewalls 41, 42 positioned in the recessed position of scanner unit 12 are not elastically deformed. Thus, sliding friction between neck portion 25 and inner surfaces 51, 52 or bulging portions 53, 54 becomes increased in comparison with guide member 14 placed in the non-pressed position, and the load applied during rotation of scanner unit 12 from the first position to the second position becomes increased.

As shown in FIG. 8, when neck portion 25 passes between bulging portions 53, 54, it passes through distance L2 narrower than distance L1 between inner surfaces 51, 52, so that pressure applied to neck portion 25 is increased and the sliding friction is increased. Thus, scanner unit 12, which is located in a state shown in FIG. 8, is suddenly resistant to rotation to the second position. When neck portion 25 passes the tops of bulging portions 53, 54, the distance between bulging portions 53, 54 is widened from distance L2 to distance L1, and the sliding friction applied to neck portion 25 is reduced. Then, scanner unit 12 is located in the second position.

Figure 10:
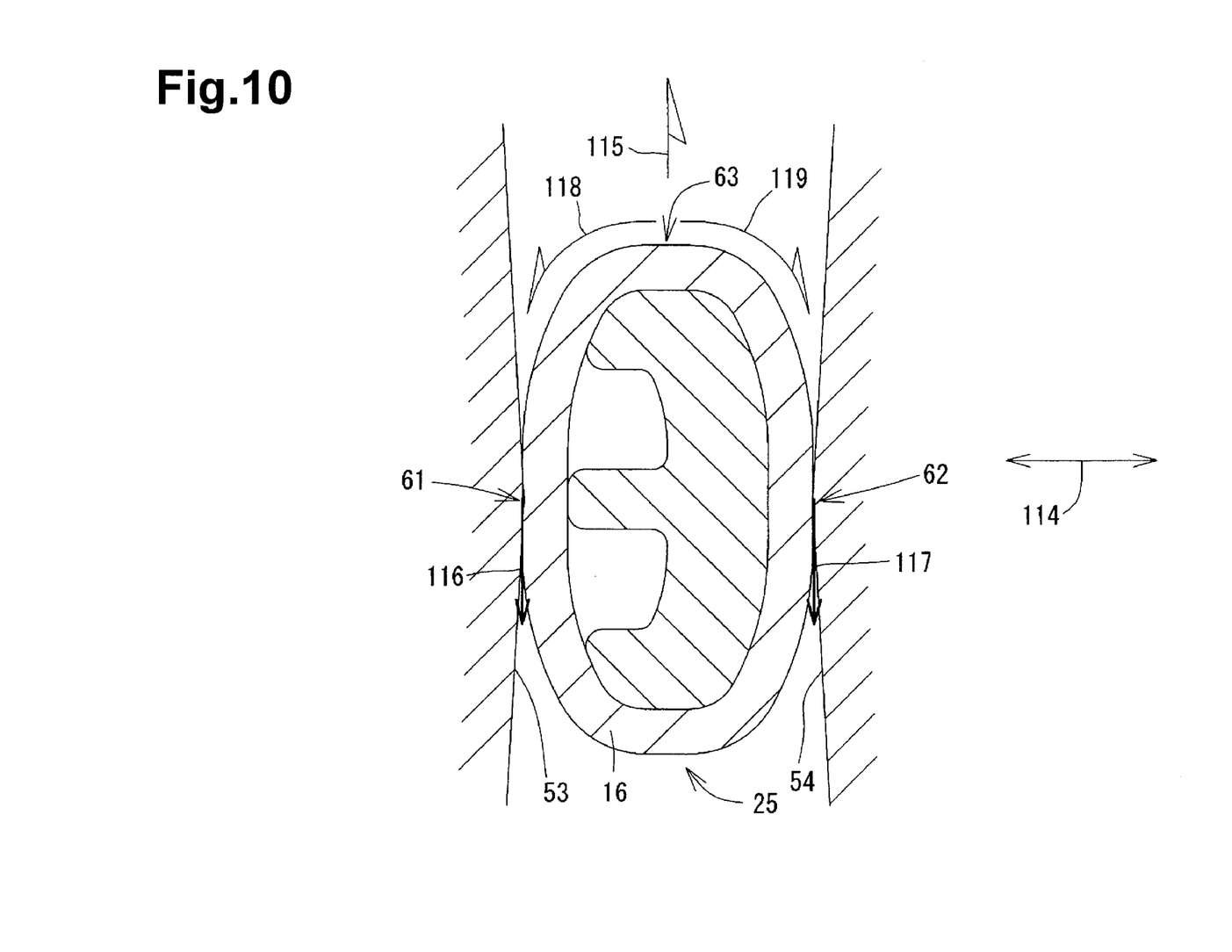
FIG. 10 is a cross sectional view of the neck portion of the support stand along the line X-X of FIG. 8.

For example, when neck portion 25 passes between bulging portions 53, 54 as shown in FIG. 8, a great sliding friction is applied to neck portion 25. As shown in FIG. 10, neck portion 25 is pressed in contact with bulging portions 53, 54, respectively, at portions 61, 62, which are located on both ends of the maximum width of neck portion 25. When stand 13 is moved in a sliding direction 115, neck portion 25 slides on bulging portions 53, 54. During this sliding, sliding friction F is produced between friction member 16 and bulging portions 53, 54 in directions of arrows 116, 117.

When sliding friction F exceeds a frictional force produced between the body of neck portion 25 and friction member 16, friction member 16 may be shifted in a manner to turn around the body of neck portion 25. In this embodiment, sliding friction F is equal at each portion 61, 62, and thus friction member 16 is shifted in such a manner as to thin the thickness of friction member 16 partially, without turning around the body of neck portion 25. Specifically, in a front portion of friction member 16 from portions 61, 62 in sliding direction 115, a tensile force is produced in directions of arrows 118, 119 from a portion 63, which is located at a front end with respect to the maximum length of neck portion 25 in sliding direction 115. Due to the tensile force, friction member 16 is shifted such that the thickness of friction member 16 is slightly thinned in the front portion and is slightly increased in a rear portion of friction member 16 from portions 61, 62 in sliding direction 115.

Even if the thickness of friction member 16 is increased in the rear portion from portions 61, 62 in sliding direction 115, friction member 16 does not slide on bulging portions 53, 54 by sliding friction greater than that applied to portions 61, 62, due to the increase in the thickness. Friction member 16 contacts bulging portions 53, 54, at portions 61, 62, which are located on both ends of the maximum width of neck portion 25. The peripheral surface of friction member 16 is curved in directions away from bulging portions 53, 54 in front of and behind portions 61, 62 in sliding direction 115. Thus, the thickness of friction member 16 is increased at portions 61, 62 not only toward bulging portions 53, 54 but also toward the body of neck portion 25.

As described above, due to the oval shape of neck portion 25, the tensile force is produced from portion 63 to portions 61, 62, and reduction in the thickness of friction member 16 in the front portion from portions 61, 62 in sliding direction 115 becomes relatively small. Thus, increase in the thickness of friction member 16 in the rear portion from portions 61, 62 in sliding direction 115 also becomes relatively small. In the rear portion, the thickness of friction member 16 is increased toward not only bulging portions 53, 54 but also the body of neck portion 25. If the thickness of friction member 16 is increased due to sliding friction F, sliding friction F is not extremely increased at a portion of friction member 16 whose thickness has been increased.

According to the embodiment, neck portion 25 of stand 13 is generally oval in cross section perpendicular to the direction 113 along which second end portion 22 is inserted into opening 40 of guide member 14. When friction member 16 slides on bulging portions 53, 54 of guide member 14, sliding friction F is increased and friction member 16 is shifted with respect to the body of neck portion 25. As the shifting is caused by the tensile force produced from portion 63 to portions 61, 62 that contact bulging portions 53, 54, a change in thickness of friction member 16 becomes relatively small and the thickness of friction member 16 is not extremely increased around portions 61, 62.

Friction member 16 contacts bulging portions 53, 54 at portions 61, 62. If the thickness of friction member 16 is increased at a part of the rear portion from portions 61, 62 contacting bulging portions 53, 54 in sliding direction 115, sliding friction F is not extremely increased at the part of the rear portion where the thickness is increased. Thus, friction member 16 of stand 13 can be prevented from being worn out on one side.

According to the embodiment, neck portion 25 may be generally oval in cross section. Neck portion 25 may be also circle in cross section. Neck portion 25 may be shaped such that its cross section has a maximum width and a maximum length equal to or greater than the maximum width. Portions 61, 62 may define the maximum width of neck portion 25.

In the embodiment, neck portion 25 is interposed between opposing sidewalls 41, 42 of guide member 14 to slide on inner surfaces 51, 52. Guide member 14 may not have sidewalls 41, 42. Instead, guide member 14 may make up one wall and casing of scanner unit 12 may make up the other wall.

In the embodiment, distance L1 between opposing sidewalls 41, 42 of guide member 14 is narrowed to distance L2 at bulging portions 53, 54. However, bulging portions 53, 54 may be omitted.

In the embodiment, the first casing is for printer unit 11 and the second casing is for scanner unit 12. Printer unit 11 may be disposed in the second casing and scanner unit 12 may be disposed in the first casing. The first casing and the second casing may be used for other functional units of the image forming apparatus.

What is claimed is:

1. An opening and closing assembly comprising:
    a first casing having a connected portion and a distant portion that is distant from the connected portion;
    a second casing having a connected portion and a distant portion that is distant from the connected portion of the second casing, the second casing being connected at the connected portion thereof to the connected portion of the first casing, and being pivotable about the connected portions of the respective first and second casings relative to the first casing so as to be selectively placed in open and closed positions relative to the first casing; and
    a support stand configured to support the second casing so as to maintain the open position of the second casing when the second casing is to be held in the open position, the support stand including a proximal end portion that is pivotably connected to the distant portion of one of the first and second casings and a distal end portion that is slidably connected to the other of the first and second casings,
    wherein the other of the first and second casings includes a guide portion configured to guide the distal end portion of the support stand, for permitting the distal end portion of the support stand to be slidable between the connected portion and the distant portion of the other of the first and second casings, and first and second wall portions opposed to each other and cooperating with each other for gripping the distal end portion of the support stand that is interposed between the first and second wall portions,
    wherein the distal end portion of the support stand includes a gripped portion at which the distal end portion is gripped between the first and second wall portions of the other of the first and second casings, and the gripped portion is brought into slidable contact with the first and second wall portions of the other of the first and second casings,
    wherein the gripped portion has a cross section having a width and a length, the width of the cross section increases from one end of the cross section to a maximum width, and decreases from the maximum width until the other end of the cross section, the maximum width of the cross section of the gripped portion causes the first and second wall portions of the other of the first and second casings to be spaced apart,
    wherein the gripped portion is configured to slide between the first and second wall portions in a direction substantially parallel to the length of the cross section of the gripped portion, and
    wherein the gripped portion includes an elastically deformable member, which contacts the first and second wall portions of the other of the first and second casings, and the gripped portion has a space covered by the elastically deformable member.

2. The opening and closing assembly according to claim 1, wherein the first and second wall portions of the other of the first and second casings have shapes such that a distance therebetween gradually changes in a direction where the gripped portion slides.

3. The opening and closing assembly according to claim 2, wherein the first wall portion includes a first bulging portion and the second wall portion includes a second bulging portion opposing the first bulging portion.

4. The opening and closing assembly according to claim 3, wherein the first and second bulging portions are located on a side close to the distal end portion of the support stand when the second casing is placed in the closed position.

5. The opening and closing assembly according to claim 1, wherein the cross section has rounded corners.

6. The opening and closing assembly according to claim 1, wherein the cross section is generally oval.

7. The opening and closing assembly according to claim 1, wherein the elastically deformable member is formed of rubber.

8. An opening and closing assembly comprising:
    a first casing;
    a second casing disposed on top of and coupled to the first casing via a hinge portion, the second casing being rotatable between a first position and a second position with respect to the first casing;
    a support stand configured to support the second casing in the first position in which the second casing is rotated upward from the first casing, the support stand having a first end portion and a second end portion opposite to the first end portion, the first end portion being pivotally connected to the first casing; and
    a guide member having first and second wall portions opposed to each other, the guide member being disposed in the second casing, the guide member being configured to guide the second end portion of the support stand between the first and second wall portions in connection with a rotational movement of the second casing,
    wherein the second end portion of the support stand includes a gripped portion at which the second end portion is gripped between the first and second wall portions of the guide member, and the gripped portion is brought into slidable contact with the first and second wall portions of the guide member,
    wherein the gripped portion has rounded corners in a cross section taken along a line perpendicular to a first direction in which the second end portion is guided by the guide member, the cross section has a maximum width, and the maximum width of the cross section of the gripped portion causes the first and second wall portions of the guide member to be spaced apart,
    wherein the gripped portion is configured to slide between the first and second wall portions in a direction substantially perpendicular to the maximum width of the cross section of the gripped portion, and
    wherein the gripped portion includes an elastically deformable member, which contacts the first and second wall portions of the guide member, and the gripped portion has a space covered by the elastically deformable member.

9. The opening and closing assembly according to claim 8, wherein the gripped portion is generally oval in the cross section.

10. The opening and closing assembly according to claim 8, wherein the first and second wall portions of the guide member have shapes such that a distance therebetween gradually changes in a direction where the gripped portion slides.

11. The opening and closing assembly according to claim 10, wherein the first wall portion includes a first bulging portion and the second wall portion includes a second bulging portion opposing the first bulging portion.

12. The opening and closing assembly according to claim 10, wherein the first and second bulging portions are located on a side close to the second end portion of the support stand when the second casing is placed in the closed position.

13. The opening and closing assembly according to claim 8, wherein the elastically deformable member is formed of rubber.

14. An image forming apparatus comprising:
- a printer unit configured to record an image on a recording medium;
- a scanner unit configured to read an image on a document;
- a first casing including the printer unit;
- a second casing including the scanner unit, the second casing being disposed on top of and coupled to the first casing via a hinge portion, the second casing being rotatable between a first position and a second position with respect to the first casing;
- a support stand configured to support the second casing in the first position in which the second casing is rotated upward from the first casing, the support stand having a first end portion and a second end portion opposite to the first end portion, the first end portion being pivotally connected to the first casing; and
- a guide member having first and second wall portions opposed to each other, the guide member being disposed in the second casing, the guide member being configured to guide the second end portion of the support stand between the first and second wall portions in connection with a rotational movement of the second casing, wherein the second end portion of the support stand includes a gripped portion at which the second end portion is gripped between the first and second wall portions of the guide member, and the gripped portion is brought into slidable contact with the first and second wall portions of the guide member, and wherein the gripped portion has rounded corners in a cross section taken along a line perpendicular to a first direction in which the second end portion is guided by the guide member, the cross section has a maximum width, and the maximum width of the cross section of the gripped portion causes the first and second wall portions of the guide member to be spaced apart, wherein the gripped portion is configured to slide between the first and second wall portions in a direction substantially perpendicular to the maximum width of the cross section of the gripped portion, and wherein the gripped portion includes an elastically deformable member, which contacts the first and second wall portions of the guide member, and the gripped portion has a space covered by the elastically deformable member.

* * * * *